Patented July 1, 1952

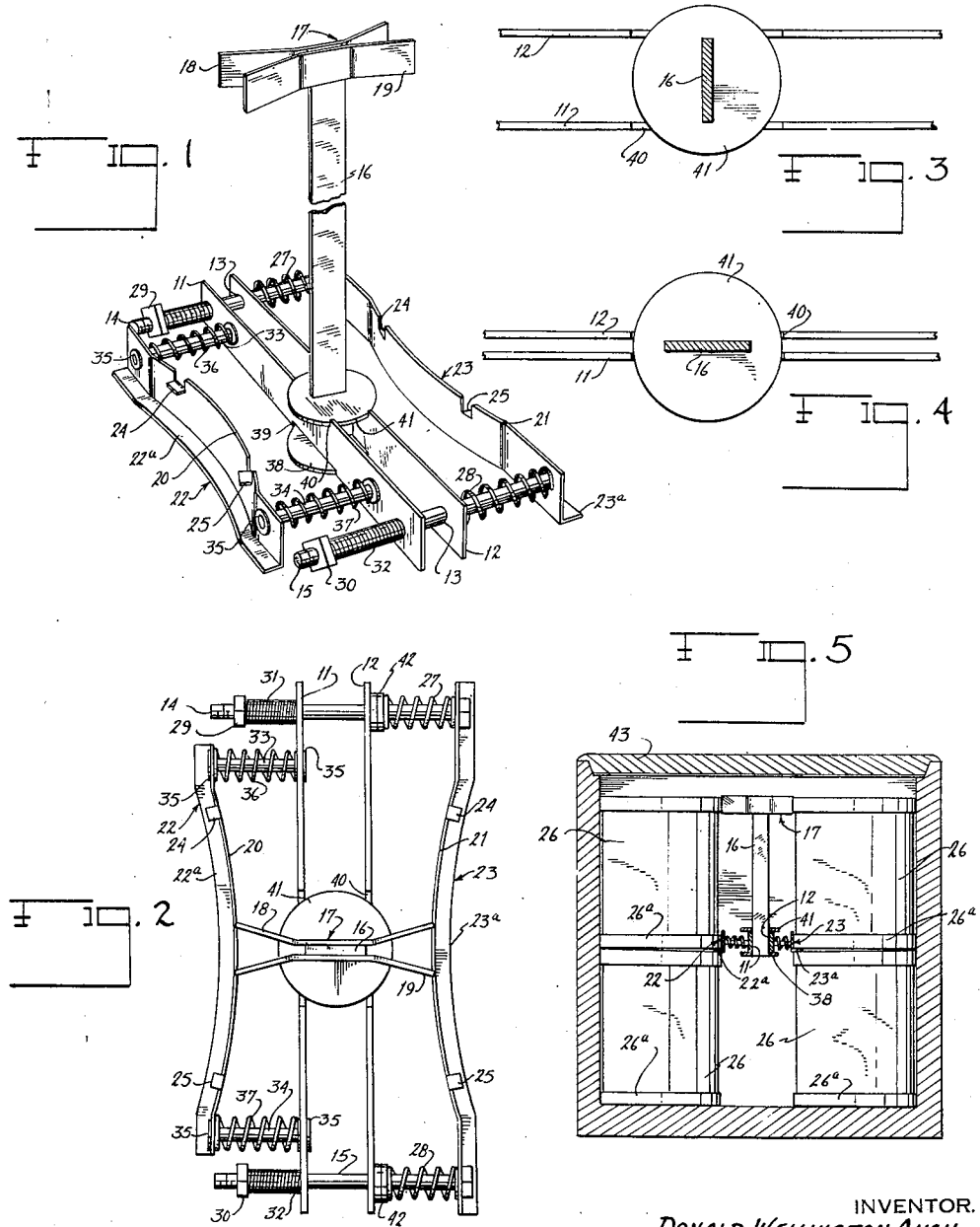

2,601,935

UNITED STATES PATENT OFFICE 2,601,935

DEVICE FOR HOLDING ICE-CREAM CANS IN POSITION

Donald Wellington Auch, West Conshohocken, Pa.

Application July 7, 1948, Serial No. 37,395

7 Claims. (Cl. 220—15)

This invention relates in general to means for holding cans and the like in desired position, and more particularly, to a device for retaining ice cream cans in a receptacle or refrigerating cabinet against rotation and angular movement.

The principal object of the invention is to provide an improved ice cream can retaining device, of simplified design and inexpensive construction, and particularly adapted for use with refrigerating and storage cabinets.

Another object of the invention is to provide an ice cream can retaining device, embodying certain desired improvements in the way of simplified adjusting and spacing means, and a further assurance against rotation and tilting of the respective cans in a refrigerating cabinet, while ice cream is being dispensed from the cans.

Another object of the invention is to provide an efficient simplified device for preventing turning and tilting movement of cans whether in storage cabinets or while being transported.

Other objects and advantages residing in the combination and arrangement of the parts will appear more fully hereinafter.

The present invention particularly contemplates the provision of a highly efficient, yet inexpensive device for preventing the turning or angular displacement of ice cream cans in a storage compartment while ice cream is being scraped or dispensed from the cans. It is particularly adapted for use with cylindrical ice cream containers formed principally of material such as paste-board, which are intended for discarding after emptying.

The present device is especially designed to engage and penetrate the ice or frozen moisture coating the exterior of the cans, thereby preventing their tendency to turn while the ice cream is being dispensed. In addition, it maintains the upper part of the can in vertical alignment, so that no tilting of the can, either at the top or the bottom, may occur.

In the drawings:

Figure 1 is a perspective view of a preferred embodiment of the invention, and showing the device as it appears when operably expanded for the engagement of ice cream cans (not shown);

Figure 2 is a plan view of same;

Figure 3 is a fragmentary plan view, partly in section, showing the lever bar turned to tension the clamping members;

Figure 4 is a view similar to Figure 3, and showing the lever bar and co-acting parts in normal position prior to use; and, Figure 5 is an elevational view particularly in section, and showing a plurality of ice cream cans in a receptacle, and with two of these cans operatively engaged by the device of the present invention.

Referring now to the drawings in detail, and wherein similar characters of reference indicate corresponding parts in the several views of the preferred form of the invention, the numerals 11 and 12 designate a pair of bars arranged in spaced parallelism and constituting a centrally positioned, expansible abutment.

The horizontally extending bars or straps 11, 12, are apertured at their opposite ends, as at 13, to slidably accommodate the shanks of a pair of elongated screw bolts 14, 15.

Turnably arranged at its lower end, between the bars 11, 12 is a vertically-positioned lever or manipulating bar 16, to the upper end of which a combination handle and spacing means designated generally at 17, is fastened. The spacing handle 17 is composed of two plates or straps 18, 19 welded or otherwise suitably secured to the bar 16, and projecting laterally therefrom in divergent relation. These plates 18, 19 have their outer extremities, as best shown in Figure 2, substantially in vertical alignment or co-extensiv with the upper edges, 20, 21, of a pair of arcuately configured resilient straps or clamping members 22, 23.

Each of the resilient members 22, 23 has its upper edge provided with a pair of transversely-extending prongs or protrusions 24, 25 which serve, as hereinafter described, to engage and partially penetrate the paste-board sides of the respective ice cream cans designated generally at 26.

As best shown in Figure 2, it will be observed that the clamping member 23 is longer than the oppositely positioned clamping member 22, and is slidably mounted on the shanks of the screw bolts 14, 15 and resiliently and yieldably urged by a pair of springs 27, 28 on the same bolts and against the heads of said bolts which serve as stops to limit their outward movement. The outer portions of the bolts 14, 15 are threaded to accommodate nuts 29, 30 that adjustably engage coil springs 31, 32 and thrust the latter against the bar 11. The springs 31, 32 are weaker than springs 27, 28 in order that each clamping member with its associated central abutment bar 11 or 12 may move and be tensioned uniformly when the operating lever bar 16 is turned 90 degrees or from the position shown in Figure 4 to the position shown in Figures 2, 3, and 4.

The other clamping member 22 is slidably mounted on studs 33, 34 which, in turn, are slidably accommodated in holes arranged in opposed relation in the bar 11 and member 22. The opposite ends of the studs 33, 34 are peened over to retain washers, as at 35, that serve as stops to limit the relative movement of the said bar 11 and member 22. Coil springs 36, 37 arranged on the studs 33, 34, and confined between the adjacent bar and clamping member, maintain the latter in the operative position shown.

The lever bar 16, at its lower end, is welded or otherwise suitably fastened to a disc 38, which is rotatably seated in a recess, as at 39, formed in the bottom edge of each of the bars 11, 12. A similar recess, as at 40, turnably accommodates a second disc 41, also welded to the lever bar 16. The spaced discs 38 and 41, it will be observed, turnably secure the lever bar to and between the central abutment bars 11, 12, so that when the said lever bar is turned 90 degrees, the said bars and consequently the clamping members 22, 23 resiliently connected thereto, will be urged to their effective clamping position, as indicated in Figures 1 and 2. In order to vary or preadjust the tension of the coil springs 27, 28, a plurality of washers 42 may be interposed between abutment bar 12 and clamping member 23. By increasing or decreasing the number of washers, it will be evident that the tension of the coil springs 27, 28 may be correspondingly varied. The tension of the weaker springs 31, 32 is also susceptible to variation by means of the nuts 29, 30; it being further apparent that this last indicated adjustment will also affect the tension of the larger springs 27, 28.

In further accordance with the invention, each of the members 22, 23, is formed with a lower flange 22a, 23a; these flanges being adapted to seat under the lower metallic hoop 26a of each ice cream can, while at the same time, the prongs 24, 25 will thrust through the frozen moisture on exterior of the cans in the refrigerator or receptacle 43 and partially penetrate the pasteboard periphery of these containers. The function and mode of operation of the device has been in large measure described above, but may be summarized as follows:

Assuming that the ice cream storage cabinet or refrigerating chamber, designated generally at 43, to accommodate a plurality of ice cream containers 26, the device may be operatively engaged, for example, with an upper pair of these containers, as shown in Figure 5. It is to be understood that the device may be made in various sizes, but generally that suitable for operative engagement with commercial sizes of cans is preferred, with a view to a uniform retention of cans of this size. The mode of engagement will be understood by inspection of the drawing, the flanges 22a and 23a being thrust under the bottoms of a pair of cans, while the arcuate, resilient straps 22, 23 engage the lower hoops of said cans. The handle 17 of the lever bar 16 will now be turned through 90 degrees to thrust apart the clamping straps 22, 23, while at the same time, the outer edges of handle 17 will engage the upper hoops of the cans, thus preventing tilting or misalignment of same, while the prongs 24, 25 now penetrating the paste-board sides of the cans, will further assure against rotational movement.

This prevention of rotational as well as tilting movement is a salient feature of the invention, since its net result is to maintain the ice cream in a rigid vertical position at all times.

While a preferred embodiment of the invention is hereinbefore set forth, it is to be clearly understood that the invention is not to be limited to the exact construction illustrated and described, because various modifications of these details may be provided in putting the invention into practice within the purview of the appended claims.

What I claim is:

1. In a device for retaining cans in a receptacle against rotational movement, clamping members, movable relatively to one another, means on the members to receive lower hoop portions on cans in said receptacle, other means on the members to engage and penetrate body portions of said cans, lever means arranged between the clamping members and effective to move them relatively to one another, and additional means connected to the lever means and operative to engage upper hoop portions on the cans; whereby the cans may be retained in said receptacle against angular and rotational movements and in vertical alignment.

2. In a device for retaining cans in a receptacle against rotational movement, a pair of clamping members, a lever arranged between and effective to bodily move said members towards and away from each other, springs yieldingly and resiliently maintaining said members in engagement with cans in said receptacle, instrumentalities engaging the springs and effective for varying their tension, other instrumentalities secured to the members and effective for penetrating the periphery of said cans and thereby secure the cans against rotational movement, and means arranged on said lever and operative to engage upper portions of cans in said receptacle and maintin them in vertical alignment.

3. In a device for retaining cans in a receptacle against rotational movement, a pair of bars, means slidably connecting the bars, a manually operable bar arranged between and in a plane normal to said pair of bars, a clamping member connected to each of said pair of bars, springs arranged between each clamping member and one of the bars of said pair, and means on said manually operable bar for engaging the upper portion of cans within said receptacle.

4. In a device for retaining ice cream cans in a receptacle against rotational movement, a pair of clamping elements for engaging lower portions of ice cream cans, a plurality of means resiliently and yieldingly urging said clamping members into spaced relation, manually operable means for extending the effective range and increasing the tension of said clamping members, and other means arranged on an upper portion of said manually operable means and effective for engaging upper portions of ice cream cans.

5. In a device for preventing tilting and rotational movement of cans in a receptacle, in combination, can engaging means, a plurality of springs urging said can engaging means apart in spaced relation, manually operable means connected to said can engaging means and effective to increase the tension thereof, and other means secured to an upper portion of said manually operable means and effective for retaining the upper portions of cans in vertical alignment with their lower portions.

6. In a device for preventing tilting and rotational movement of cans in a receptacle, in combination, a plurality of means for engaging hoops on the lower portion of said cans, a plurality of resilient means for maintaining said hoop engaging means in spaced relation and yieldably engaged with the hoops, manually operable means for extending the hoop engaging means laterally, projections on said first mentioned means for engaging the body portions of said cans, and additional means on the upper portion of said manually operable means and effective for engaging hoops on the upper portion of said containers; whereby ice cream cans in a receptacle may be clamped against movement and maintained in vertical alignment.

7. In a device for preventing tilting, rotational and bodily movements of cans in a receptacle, in combination a pair of clamping elements for engaging lower portions of cans, a plurality of means resiliently maintaining said clamping members in normal spaced relation, lever means for increasing the tension of said clamping members, and instrumentalities projecting from said lever means and effective for engaging upper portions of said cans; whereby rotational tilting and bodily movements of the cans are prevented.

DONALD WELLINGTON AUCH.

REFERENCES CITED

The following references are of record in the file of this patent:

UNITED STATES PATENTS

| Number | Name | Date |
|---|---|---|
| 884,315 | Carroll | Apr. 7, 1908 |
| 1,773,070 | Willauer | Aug. 12, 1930 |
| 1,833,764 | Trembloy et al. | Nov. 24, 1931 |
| 2,117,992 | Pool | May 17, 1938 |
| 2,283,813 | Kreiling | May 19, 1942 |
| 2,295,609 | Shimon | Sept. 15, 1942 |
| 2,354,935 | Andrea | Aug. 1, 1944 |
| 2,363,256 | Manning et al. | Nov. 21, 1944 |
| 2,401,417 | Engle | June 4, 1946 |